United States Patent [19]

Tokura et al.

[11] 4,088,100

[45] May 9, 1978

[54] AIR/FUEL RATIO CONTROL SYSTEM IN INTERNAL COMBUSTION ENGINE

[75] Inventors: Naomi Tokura, Yokosuka; Kenji Okamura, Yokohama, both of Japan

[73] Assignee: Nissan Motor Company, Limited, Japan

[21] Appl. No.: 636,658

[22] Filed: Dec. 1, 1975

[30] Foreign Application Priority Data

Dec. 2, 1974 Japan .............................. 49-139069
Dec. 28, 1974 Japan .................................. 50-1406

[51] Int. Cl.² ............................................ F02B 33/00
[52] U.S. Cl. ............................ 123/119 EC; 123/127; 123/140 MC; 261/DIG. 74; 123/124 B
[58] Field of Search ........ 123/32 EA, 32 AE, 179 G, 123/179 H, 140 MC, 119 EC, 124 E, 119 R, 127; 261/121 B, DIG. 74

[56] References Cited

U.S. PATENT DOCUMENTS

| 2,657,913 | 11/1953 | Raymor | 123/127 |
| 3,759,232 | 9/1973 | Wahl | 123/32 AE |
| 3,827,237 | 8/1974 | Linden | 123/140 MC |
| 3,890,946 | 6/1975 | Wahl | 123/140 MC |

Primary Examiner—Ronald H. Lazarus

[57] ABSTRACT

The system is associated with an engine equipped with a carburetor and includes a fuel supply conduit and/or air supply conduit each opening at its one end into an intake pipe at a location downstream of the throttle valve, an electromagnetic valve for each conduit arranged to control a fluid flow through each conduit, an exhaust gas sensor disposed in the exhaust system, and a control circuit which operates the electromagnetic valve such that the feed rate of fuel or air through each conduit is varied to compensate for any deviation indicated by a signal from the sensor of the air/fuel ratio of an air-fuel mixture consumed in the combustion chamber from a predetermined ratio.

4 Claims, 9 Drawing Figures

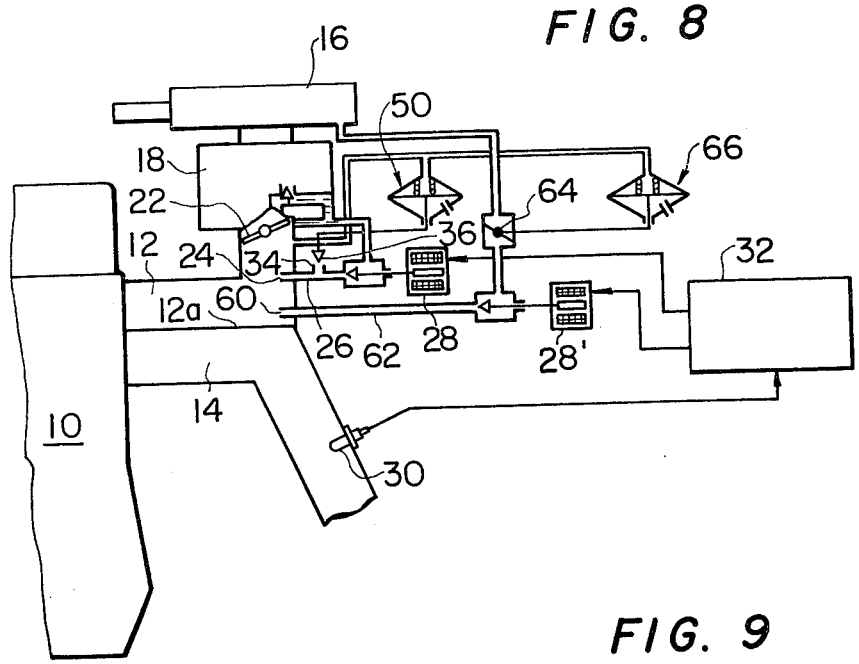
FIG. 8
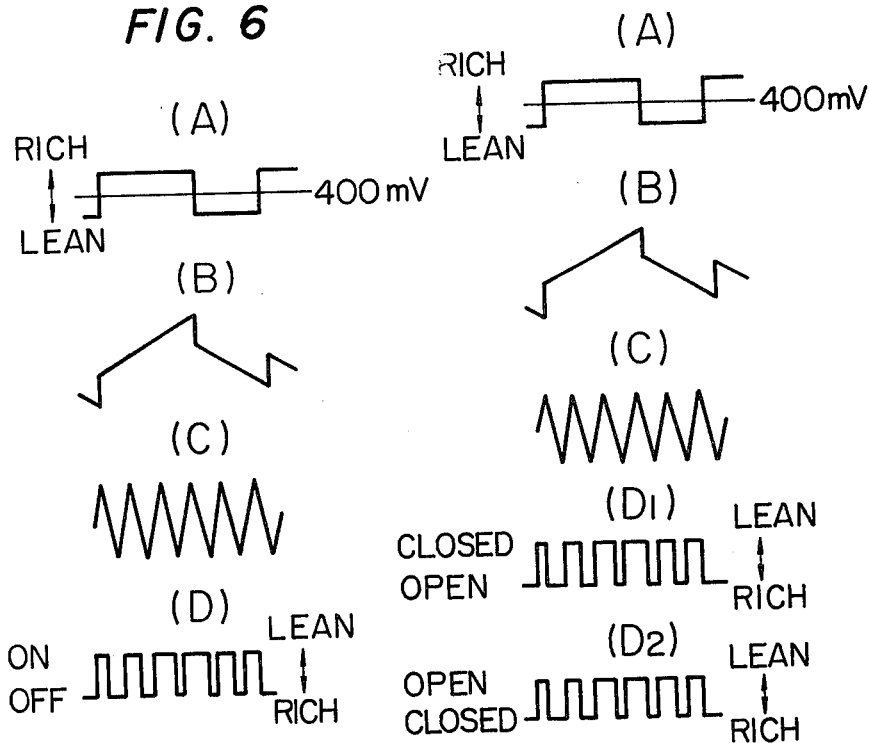
FIG. 6
FIG. 9

AIR/FUEL RATIO CONTROL SYSTEM IN INTERNAL COMBUSTION ENGINE

This invention relates to a control system for maintaining the air-fuel ratio of an air-fuel mixture fed to an internal combustion engine, which is equipped with a carburetor, at a predetermined ratio.

In the art of internal combustion engines, it is one of fundamental requisites to success in removing harmful components, or at least reducing for the most part, from the exhaust gas that the air/fuel ratio of an air/fuel mixture fed to the engine is maintained at a predetermined ratio with high precision.

When, for example, the removal of the harmful components is accomplished by the use of a recently developed catalyst which comprises a plurality of platinum group metal and catalyzes both the oxidation of carbon monoxide and unburned hydrocarbons and reduction of oxides of nitrogen, the catalyst exhibits a significant lowering of its catalytic ability unless the air/fuel ratio of the air-fuel mixture fed to the engine is kept exactly at an optimum ratio which is in the vicinity of the stoichiometric ratio.

It is quite difficult, however, to maintain the air/fuel ratio exactly constant even if a carburetor is constructed and adjusted very precisely since the air/fuel ratio is affected by physical properties of air and fuel such as density and viscosity, which are variables depending on the atmospheric pressure, ambient temperature and fuel temperature. Some techniques to electronically control the fuel discharge rate in a carburetor have been proposed to obviate such difficulty, but these techniques inevitably result in structural complication of the carburetor and a considerable increase in the production cost.

It is an object of the present invention to provide a control system which maintains the air/fuel ratio of an air-fuel mixture fed to an internal combustion engine equipped with a conventional carburetor and can be combined with the engine needing no substantial modification of the carburetor.

A control system according to the invention comprises: at least one conduit opening at one end into an intake pipe of the engine at a section downstream of the throttle valve of the carburetor and at the other end to a source of one component of an air-fuel mixture; an electromagnetic valve for each conduit arranged to control a flow of a fluid through the aforementioned each conduit; and a device for operating the electromagnetic valve such that the mass flow rate of the aforementioned one component of the air-fuel mixture in each conduit is varied to compensate for any deviation of the air-fuel ratio of an air-fuel mixture consumed in the combustion chamber of the engine from a predetermined ratio. The system further comprises an exhaust gas sensor which senses the concentration of a particular component of the exhaust gas in the exhaust system of the engine having dependence on the air/fuel ratio of the air-fuel mixture consumed in the combustion chamber of the engine and supplies an electrical signal representing the sensed concentration to the aforementioned device, and the device operates the electromagnetic valve in response to this electrical signal.

In a first aspect of the invention, the system has only a single conduit which allows the fuel as the aforementioned one component to flow therethrough, and the carburetor is adjusted to create constantly an air/fuel ratio higher than the predetermined ratio.

In a second aspect, the system has only a single conduit which allows air to flow therethrough, and the carburetor is adjusted to create constantly an air/fuel ratio lower than the predetermined ratio.

In a third aspect, the system has two conduits which allow the fuel and air to flow therethrough, respectively, and the carburetor is adjusted to create the predetermined air/fuel ratio.

Other features and advantages of the invention will become apparent from the following detailed description of preferred embodiments with reference to the accompanying drawings, wherein.

Figure 1:
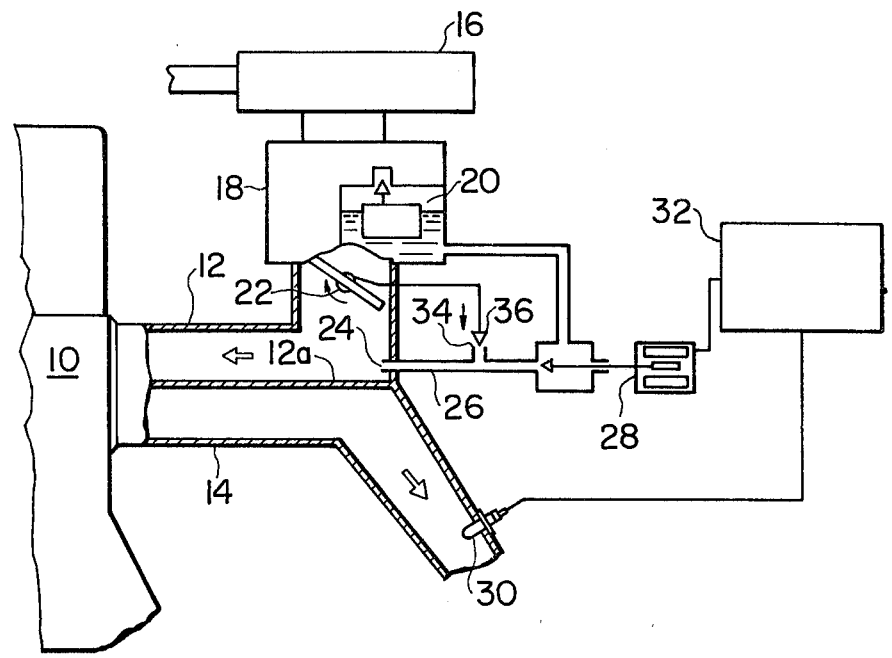
FIG. 1 is a schematic illustration of an air-fuel ratio control system as a first embodiment of the invention in conjunction with a conventional internal combustion engine and a carburetor.
Figure 4:
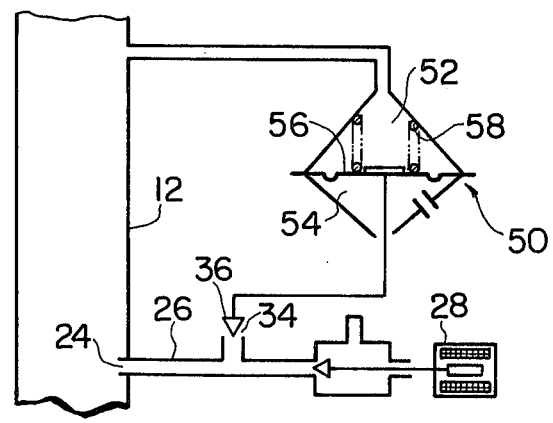
Figure 2:
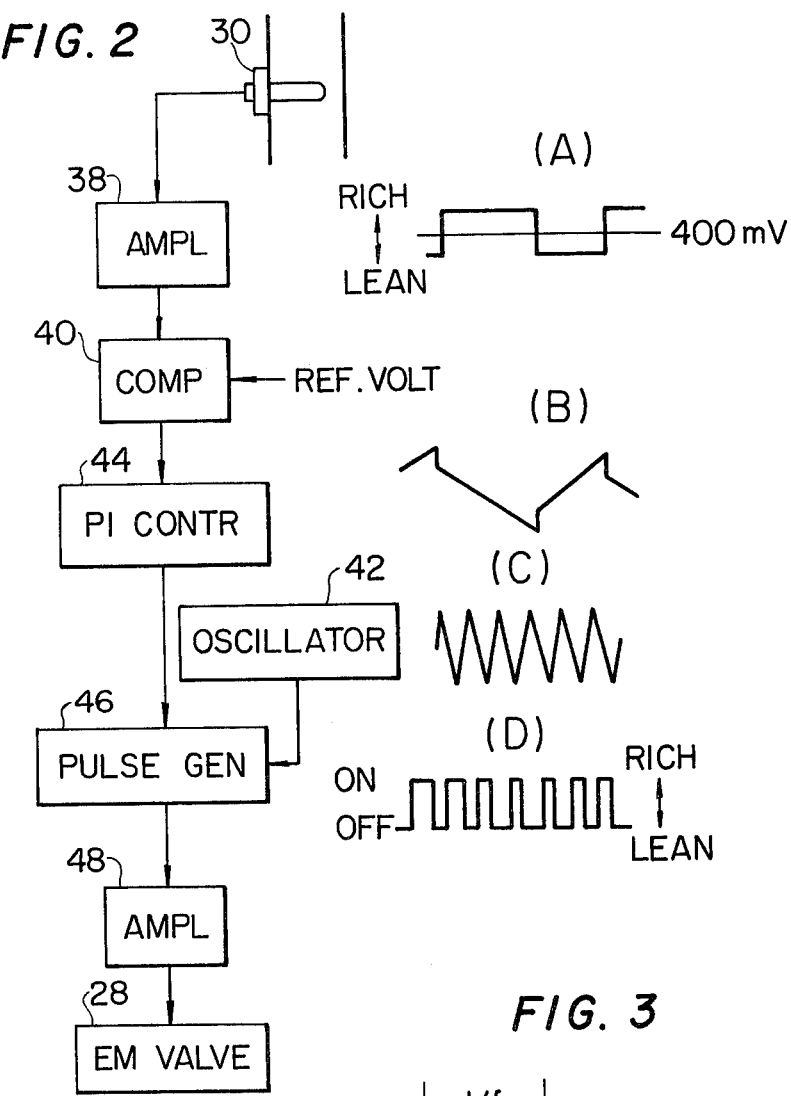
FIG. 2 is a block diagram of a control circuit in the system of FIG. 1.
Figure 3:
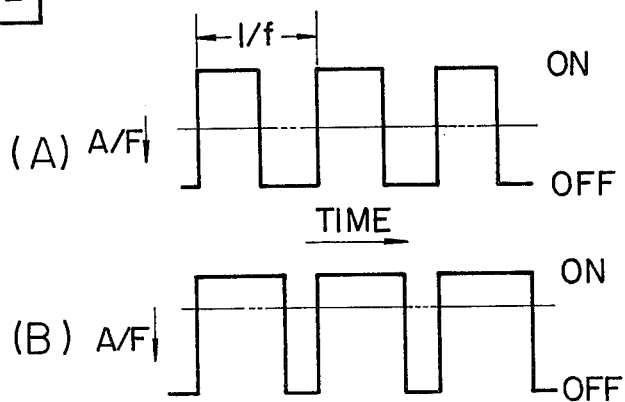
Figure 5:
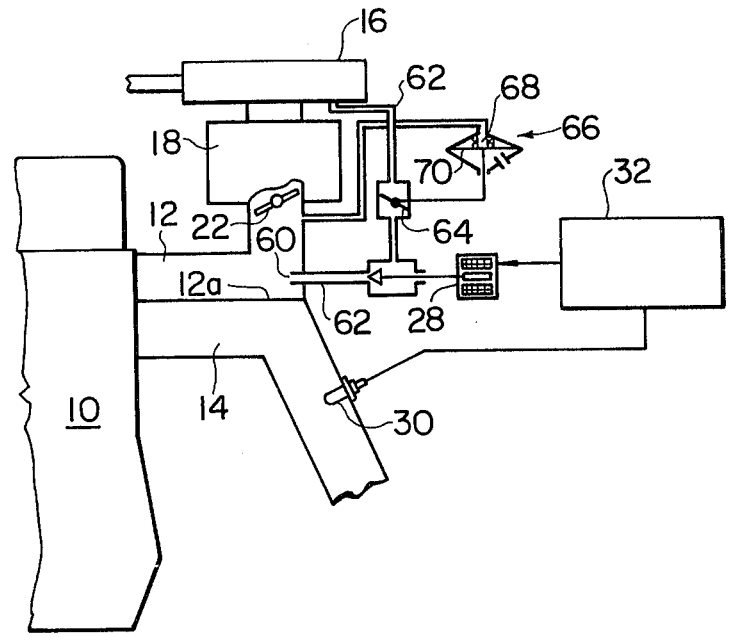
Figure 7:
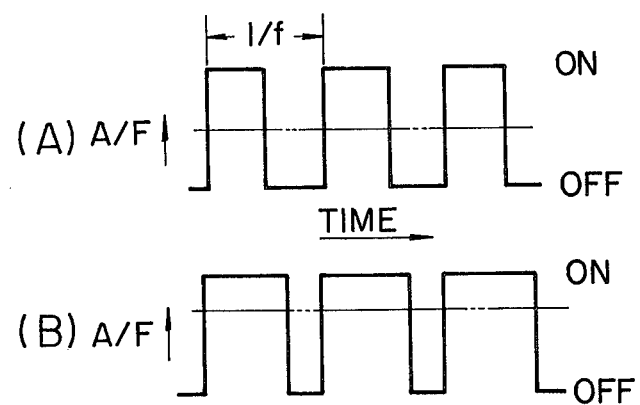

FIG. 3 presents schematic charts representing the function of an electromagnetic valve in the system of FIG. 1;

FIG. 4 is a sketch of a valve control apparatus which is useful for partial modification of the system of FIG. 1;

FIGS. 5 and 8 are schematic views generally similar to FIG. 1 but show second and third embodiments of the invention, respectively;

FIGS. 6 and 9 show waveforms of the outputs of the respective elements of the control circuit of FIG. 2 with respect to the control systems of FIGS. 5 and 8, respectively; and FIG. 7 is a chart generally similar to FIG. 3 but with respect to the system of FIG. 5.

Referring to FIG. 1, a conventional internal combustion engine indicated at 10 has a usual intake pipe 12 and an exhaust pipe 14. The intake pipe 12 communicates with an air cleaner 16 and a conventional carburetor 18. In the carburetor 18, fuel flowing from a float chamber 20 is introduced into an air stream and atomized to give an air-fuel mixture with an approximately constant air/fuel ratio. The feed rate of the air-fuel mixture to the engine 10 through the intake pipe 12 depends on the degree of the opening of a throttle valve 22.

In the embodiment of FIG. 1, an auxiliary fuel supply system is combined with the carburetor 18 and the intake pipe 12 as a measure for correcting or regulating the air/fuel ratio of the air-fuel mixture supplied from the carburetor 18 to an exactly constant value while the mixture flows in the intake pipe 12.

An auxiliary fuel nozzle 24 of the auxiliary fuel supply system opens into the intake pipe 12 at a section downstream of the throttle 22 of the carburetor 18. The fuel nozzle 24 is positioned close to the so-called "riser" section 12a (which is a section of the intake pipe 12 occupying an upstream end portion of a longer section where the intake pipe 12 is arranged very close to or adjacent the exhaust pipe 14 for the purpose of promoting the vaporization of the fuel in the air-fuel mixture) and connected with the float chamber 20 of the carburetor 18 via a conduit or an auxiliary fuel discharge passage 26. The flow of the fuel through the passage 26 is controlled by an electromagnetic valve 28. The auxiliary fuel supply system includes an exhaust gas sensor 30 which is disposed in the exhaust pipe 14 to produce an electrical signal representing the concentration of a specific component of the exhaust gas and a control circuit 32 which governs the operation of the electromagnetic valve 28 in response to the signal from the exhaust gas sensor 30. The exhaust gas sensor 30 is used by reason that the sensed concentration of the specific component of the exhaust gas varies depending on the composition of the air-fuel mixture subjected to combustion in the combustion chambers of the engine 10. Preferably, oxygen is taken as the specific component because of an exact dependence of its concentration in the exhaust gas on the air-fuel ratio realized in the combustion chambers at the moment of combustion and ease in obtaining a practicable sensor. The exahust gas sensor 30 is preferably a conventional oxygen sensor of the concentration cell type having an ion-conducting solid electrolyte exemplified by stabilized zirconia ($ZrO_2$—CaO).

The fuel passage 26 is preferably provided with an air bleed 34 at a section downstream of the electromagnetic valve 28. The orifice area of this air bleed 34 is variable by the provision of a needle valve 36 which is linked with the throttle valve 22 such that the effective orifice area increases as the degree of the opening of the throttle valve 22 decreases (i.e., as the magnitude of the intake vacuum increases), and vice versa. Consequently, the fuel discharge rate from the nozzle 24 is prevented from increasing excessively as the magnitude of the intake vacuum increases and decreasing excessively as the intake vacuum weakens.

FIG. 2 shows an example of the control circuit 32 for operating the electromagnetic valve 28. This control circuit 32 includes an amplifier 38 for the amplification of the output of the oxygen sensor 30, a comparator 40 for comparing the amplified output with a reference voltage, an oscillator 42 which produces a continuous triangular wave of a predetermined frequency, a PI (proportional and integral) control amplifier 44 for modulating the output of the comparator 40, and a pulse generator 46 which produces rectangular pulses at the same frequency as the triangular wave. The widths of the individual pulses are varied depending on the amplitude and waveform of the output of the PI control amplifier 44. The pulses are supplied to the electromagnetic valve 28 through an amplifier 48.

The carburetor 18 is preliminarily adjusted such that the air/fuel ratio of the air-fuel mixture prepared in the carburetor 18 is constantly and substantially higher than an intended ratio such as a stoichiometric ratio. With an air-gasoline mixture of which stoichiometric air/fuel ratio is approximately 14.8 by weight, the carburetor 18 is adjusted to produce an air/fuel ratio of about 16, for example. The auxiliary fuel discharge passage 26, fuel nozzle 24 and the electromagnetic valve 28 are so arranged as to add the fuel to the thus prepared comparatively lean air-fuel mixture in an amount just sufficient for producing the intended air/fuel ratio when properly controlled by the electromagnetic valve 28.

If the fuel discharge rate from fuel nozzle 24 is kept constant during operation of the engine 10, the initially settled air/fuel ratio (as intended) is subject to changes resulting from inevitable influences of the engine operational conditions on the function of the carburetor 18. When the carburetor 18 is subjected to a temperature increase in the ambient temperature, for example, there occurs a decrease in the air/fuel ratio of the mixture supplied from the carburetor 18 by reason that the density of air decreases by a larger percentage than the density of fuel in the carburetor 18.

The deviations of the air/fuel ratio actually realized in the combustion chambers from the intended ratio can be detected by the comparison of the output voltage of the oxygen sensor 30 with an appropriately determined reference voltage, e.g., of 400 mV, in the comparator 40. When the output voltage of the oxygen sensor 30 is above 400 mV indicating that the actual air/fuel ratio is below the stoichiometric ratio, for example, the output of the PI control amplifier 44 continues to decrease its amplitude as schematically represented at (B) in FIG. 2 in comparison to a schematic representation of the waveform of the output of the sensor 30 at (A). Although the oscillator 42 produces a continuous and constant triangular wave usually at a fixed frequency as represented at (C), the widths of the individual pulses from the pulse generator 46 are variably decreased as seen at (D) when the amplitude of the output of the PI control amplifier 44 continues to decrease. The electromagnetic valve 28 is opened to provide fluid communication between the float chamber 20 and the fuel discharge passage 26 when each of these pulses is applied thereto through the amplifier 48. The decreases in the widths of the individual pulses which are produced at a fixed frequency result in enlargements of the intervals between the pulses, that is, enlargements of time periods during which the electromagnetic valve 28 is kept closed. Thus, the electromagnetic valve 28 is opened intermittently at a fixed frequency as shown in FIG. 3. The chart (A) represents the on-off function mode of the electromagnetic valve 28 when the air/fuel ratio in the combustion chambers is maintained at a predetermined rate as intended. The width of each pulse from the pulse generator 46 and hence each on-period of the electromagnetic valve 28 equal to a half of $1/f$ where $f$ is the frequency of the pulses.

As seen in FIG. 3, the fuel discharge rate from the nozzle 24 is constant (if changes resulting from changes in the magnitude of vacuum in the intake pipe 12 is neglected) and settled such that the air/fuel ratio takes a value smaller than the predetermined ratio, e.g. about 14 in the case of the predetermined ratio being 14.8, if the electromagnetic valve 28 is kept open continuously. When the air/fuel ratio in the combustion chambers is higher than the predetermined ratio, the proportion of the one-period of the electromagnetic valve 28 to the off-period is not kept at but becomes larger than 1:1 in a cycle of the on-off function of the electromagnetic valve 28 as shown by the chart (B). When the air-fuel ratio in the combustion chambers is below the predetermined ratio, the proportion of the on-period to the off-period in the same single cycle is smaller than 1:1.

The fuel discharge rate from the nozzle 24 tends to vary by the influence of the magnitude of the vacuum in the intake pipe 12: the discharge rate tends to increase and decrease as the magnitude of the intake vacuum increases and decreases, respectively. Such an unfavorable tendency can be compensated for by admitting air at a controlled rate into the fuel in the fuel discharge passage 26 through the air bleed 34. The orifice area of the air bleed 34 and the valve 36 are designed such that the fuel discharge rate from the nozzle 24 is just sufficient for producing the predetermined air/fuel ratio when the engine 10 is operated under high-speed and high-load conditions (accordingly the intake vacuum is very weak) and the opening of the valve 36 is in the least.

Thus, the auxiliary fuel can be added to the air-fuel mixture in an amount just enough to modulate the air/fuel ratio of the mixture to the predetermined ratio at any engine load. Consequently, the fuel discharge rate from the nozzle 24 and, hence, the air/fuel ratio can be controlled quite accurately by solely controlling the operation of the electromagnetic valve 28.

The fuel nozzle 24 is preferably located at or in the vicinity of the riser section 12a so that the discharged fuel may easily be vaporized by heat transfer from the exhaust pipe 14 and mix thoroughly with the air-fuel mixture supplied from the carburetor 18.

If desired, the control circuit 32 may be constructed such that the discharge rate of the auxiliary fuel is controlled in accordance with the values of some variables which represent the operational condition of the engine 10 other than the dependence on the oxygen concentration in the exhaust gas. For example, the auxiliary fuel discharge rate may be increased at high-speed and high-load conditions to prevent the engine output from becoming deficient and/or the same fuel discharge rate may be decreased during deceleration (the quantity of air admitted into the auxiliary fuel passage 26 is increased) to prevent sharp increases in the quantities of unburned fuel and carbon monoxide discharged from the engine 10 under a decelerating condition. The electromagnetic valve 28 of the on-off function type may be replaced by a linear solenoid valve (not shown) in which the degree of the valve opening varies continuously and proportionally to the amplitude of a control signal.

The needle valve 36 for controlling the admission of air through the air bleed 34 can be operated in a manner different from the embodiment of FIG. 1.

As shown in FIG. 4, the valve 36 may be linked with a vacuum-operated actuator 50 instead of with the throttle 22. The actuator 50 forms therein a vacuum chamber 52 which communicates with the intake pipe 12 at a section where vacuum of an appropriate magnitude is created during operation of the engine 10 and is partitioned from another chamber 54 in communication with the atmosphere by a flexible diaphragm 56. A compression spring 58 is installed in the vacuum chamber 52 to offer resistance of an appropriate magnitude to a movement of the diaphragm 56 towards the vacuum chamber 52. The valve 36 is connected with the diaphragm 56 and arranged such that the effective area of the air bleed 34 is increased as the diaphragm 56 moves towards the vacuum chamber 52 with increase in the magnitude of vacuum applied to the vacuum chamber 52.

As will have already been understood, it is an essential feature of the invention that the air-fuel ratio is ultimately adjusted to a predetermined ratio at a section of the intake pipe 12 downstream of the throttle 22, or, in other words, substantially independently of the carburetor 18. Accordingly, a system of the invention can be associated with a conventional carburetor of usual construction. Compared with the use of an electronically controlled carburetor in which the fuel discharge rate (accordingly the air/fuel ratio) is controlled by controlling the magnitude of air bleed to the fuel discharge passage with an electromagnetic valve, a system of the invention is advantageous in that the system can be fabricated at less production cost and that the air/fuel ratio in the combustion chambers can be varied in quicker response to a feedback signal because of a comparatively short distance between the fuel discharge nozzle 24 and the combustion chambers.

In FIG. 5, a control system as a second embodiment of the invention has no auxiliary fuel discharge nozzle but has instead an auxiliary air discharge nozzle 60 which opens into the intake pipe 12 at the same section as the fuel discharge nozzle 24 in the embodiment of FIG. 1. A conduit 61 interconnects the air discharge nozzle 60 with the air cleaner 16. Like the system of FIG. 1, this system includes the electromagnetic valve 28 to control fluid communication through this conduit 62, the control circuit 32 for operating the electromagnetic valve 28 and the oxygen sensor 30 which is disposed in the exhaust pipe 14 and connected with the control circuit 32.

When the engine 10 is provided with the control system of FIG. 5, the carburetor 18 is adjusted to prepare an air-fuel mixture having an air/fuel ratio lower than the predetermined or intended ratio. For example, the air/fuel ratio created in the carburetor 18 may be about 14 by weight when the predetermined ratio is a stoichiometric air/fuel ratio (approximately 14.8 with gasoline as the fuel). The air-admitting passage 62, air discharge nozzle 60 and the electromagnetic valve 28 are arranged such that the quantity of air discharged from the nozzle 60 is just sufficient for increasing the air/fuel ratio to a value, e.g. about 16, which is higher than the predetermined value by a predetermined magnitude if the electromagnetic valve 28 is kept open constantly. In the system of FIG. 5, the electromagnetic valve 28 opens intermittently as in the system of FIG. 1 in response to the pulses from the control circuit 32. The PI control amplifier 44 is arranged such that, when the signal from the oxygen sensor 30 indicates that the air/fuel ratio in the combustion chambers is below the predetermined ratio, the output continues to increase as represented at (B) in FIG. 6. Then the widths of the indivisual pulses from the pulse generator 46 are variable increased as shown at (D). The electromagnetic valve 28 is opened upon application of each of these pulses. As shown by the chart (A) if FIG. 7, the width of each pulse is kept equal to the interval between two pulses (accordingly, the proportion of the on-period to the off-period of the electromagnetic valve 28 is kept at 1:1) when the air/fuel ratio in the combustion chambers remains at the predetermined ratio, e.g., the stoichiometric ratio. When the air/fuel ratio in the combustion chambers is, e.g., lower than the predetermined ratio, the width of the pulses varies individually such that the proportion of the on-period of the electromagnetic valve 28 becomes larger than 1:1 as shown in the chart (B) of FIG. 6. Also in this system, the electromagnetic valve 28 may be a linear solenoid valve (not shown).

The air-admitting conduit 62 is provided with another valve 64 which controls the effective sectional area of the conduit 62 at a section upstream of the electromagnetic valve 28. This valve 64 is provided for the purpose of compensating the air discharge rate from the nozzle 60 for variations resulting from variations in the magnitude of vacuum in the intake pipe 12. The valve 64 is operated by a vacuum-operated actuator 66 which is constructed like the actuator 50 of FIG. 4, and its vacuum chamber 68 is in communication with the intake pipe 12. When the magnitude of the intake vacuum is relatively large, a flexible diaphragm 70 of the actuator 66 moves towards the vacuum chamber 68 and the valve 64 which is connected with the diaphragm 70 moves to decrease the effective cross-sectional area of the conduit 62. As a result, the air discharge rate from the nozzle 60 is prevented from an excessive increase at a great intake vacuum. When the intake vacuum is relatively weak, the actuator 66 and hence the valve 64 function in the reverse manner. The valve 64 is so arranged as not to close the conduit 62 completely even in the fully closed state of the valve 64 in order that the air/fuel ratio may be controlled by the operation of the electromagnetic valve 28 even when the valve 64 is in the fully closed state.

As a third embodiment of the invention, a control system of FIG. 8 has both the auxiliary fuel feed circuit of FIG. 1 and the axuiliary air feed circuit of FIG. 5. Both the fuel discharge nozzle 24 and the air discharge nozzle 60 open into the intake pipe 12 at the above described section (near the riser section 12a). Each circuit has an independent electromagnetic valve 28 or 28' and a single control circuit 32 governs the operation of the two electromagnetic valve 28 and 28'.

When the engine 10 is provided with the system of FIG. 8, the carburetor 18 is adjusted to produce an air-fuel mixture having the predetermined air/fuel ratio.

The operation of this system will need no detailed description. The two electromagnetic valves 28 and 28' are arranged to function in the reverse manner to one another: one of the 28 or 28' is opened when each pulse is applied thereto from the pulse generator 46 but the other 28' or 28 is closed when each pulse is applied thereto. The fuel discharge rate and the air discharge rate are adjusted such that the ratio of the latter to the former is equal to the predetermined air/fuel ratio so long as the width of each pulse supplied from the control circuit 32 is equal to each interval between two pulses. When the proportion of the width to the interval deviates from 1:1, the open-period of one electromagnetic valve 28 or 28' and the closed-period of the other electromagnetic valve 28' or 28 are increased simultaneously. FIG. 9 shows this relationship, wherein the valve function mode indicated at ($D_1$) represents the electromagnetic valve 28 for the fuel conduit 26 and the mode ($D_2$) represents the other electromagnetic valve 28' for the air conduit 62. Consequently, any deviation of the air-fuel ratio in the combustion chambers from the predetermined ratio can be corrected in quite a short time.

What is claimed is:

1. A system for supplying an air-fuel mixture to an internal combustion engine through an intake pipe including a throttle valve with the maintenance of a predetermined air/fuel ratio, the system comprising:

a carburetor located upstream of the throttle valve and adjusted to create constantly a first air/fuel ratio higher than the predetermined air/fuel ratio;

a conduit opening at one end into the intake pipe at a section downsteam of the throttle valve and at the other end to a source of fuel for the air-fuel mixture;

an electromagnetic valve which is of the on-off functioning type capable of selectively taking an open position and a closed position arranged to control the flow of said fuel through said conduit, said conduit and said electromagnetic valve being arranged such that said first air/fuel ratio is modulated to a second air/fuel ratio lower than the predetermined air/fuel ratio when the flow of said fuel in said conduit is maintained maximum;

means for sensing a concentration of a particular component of the exhaust gas in the exhaust system of the engine and producing an electrical signal representing the sensed concentration, said concentration being independence on the air/fuel ratio of an air-fuel mixture consumed in the combustion chamber of the engine;

means for intermittently opening said electromagnetic valve with a variable proportion of the period of remaining in said open position to the period of remaining in said closed position in response to said electrical signal such that the mass flow rate of said fuel in said conduit is varied to compensate for any deviation of the air/fuel ratio indicated by said electrical signal from a predetermined ratio; and means for admitting air into said conduit at a section downstream of said electromagnetic valve in a variable quantity such that said quantity increases with the increase in the magnitude of vacuum in the intake pipe.

2. A system as claimed in claim 1, wherein said air-admitting means comprise an air bleed formed in said conduit and a valve for controlling the admission of air into said air bleed, said valve being linked with the throttle valve such that said quantity is increased with decrease in the degree of the opening of the throttle valve.

3. A system as claimed in claim 1, wherein said air-admitting means comprise an air bleed formed in said conduit, a valve for controlling the admission of air into said air bleed, and an actuator having a housing and a flexible diaphragm arranged to partition the interior of said housing into a first section communicating with the atmosphere and a second section communicating with the intake system of the engine at a section where vacuum is created during operation of the engine, said diaphragm being biased towards said first section, said valve being connected with said diaphragm through said first section and being arranged such that said quantity is increased as said diaphragm moves towards said second section.

4. A system as claimed in claim 1, wherein the valve opening means intermittently opens said electromagnetic valve at a predetermined frequency.

* * * * *